US012708197B2

(12) United States Patent
Goldmann et al.

(10) Patent No.: US 12,708,197 B2
(45) Date of Patent: Aug. 18, 2026

(54) APPARATUS FOR PRODUCING BRUSHWARE AND METHOD FOR OPERATING SUCH AN APPARATUS

(71) Applicant: Zahoransky AG, Todtnau (DE)

(72) Inventors: Philipp Goldmann, Wembach (DE); Mehmet Ermis, Utzenfeld (DE); Oliver Krüger, Kirchzarten (DE)

(73) Assignee: Zahoransky AG, Todtnau (DE)

( * ) Notice: Subject to any disclaimer, the term of this patent is extended or adjusted under 35 U.S.C. 154(b) by 420 days.

(21) Appl. No.: 18/483,672

(22) Filed: Oct. 10, 2023

(65) Prior Publication Data

US 2024/0115037 A1 Apr. 11, 2024

(30) Foreign Application Priority Data

Oct. 11, 2022 (DE) ......................... 102022126277.4

(51) Int. Cl.
*A46D 3/04* (2006.01)
*F16P 3/14* (2006.01)
*G01V 8/20* (2006.01)

(52) U.S. Cl.
CPC ................ *A46D 3/04* (2013.01); *F16P 3/144* (2013.01); *G01V 8/20* (2013.01)

(58) Field of Classification Search
CPC . A46D 3/00; A46D 3/04; A46D 3/042; A46D 3/08; A46D 3/087; A46D 99/00; F16P 3/144; G01V 8/20
See application file for complete search history.

(56) References Cited

U.S. PATENT DOCUMENTS

| | | | | |
|---|---|---|---|---|
| 7,888,825 B2 * | 2/2011 | Iida | ......................... | F16P 3/147 307/326 |
| 2023/0263299 A1 * | 8/2023 | Rioja | ......................... | A46D 1/08 300/21 |

FOREIGN PATENT DOCUMENTS

| | | | |
|---|---|---|---|
| CN | 101416822 B | 10/2010 | |
| DE | 4009585 | 10/1991 | |
| DE | 10103429 A1 | 8/2002 | |
| DE | 10335996 | 2/2005 | |
| DE | 102022100716 B3 | 3/2023 | |
| EP | 1437542 A1 * | 7/2004 | .............. F16P 3/144 |
| WO | WO 2007/010795 A1 * | 1/2007 | .............. B25J 19/06 |
| WO | WO 2021/204853 A1 * | 10/2021 | ............... A46D 3/02 |

OTHER PUBLICATIONS

Computer generated English translation of EP 1437542 A1, Lohmann et al. (Year: 2004).*
Computer generated English translation of WO 2007/010795 A1, Ilda et al. (Year: 2007).*
Computer generated English translation of WO 2021/204853 A1, Boucherie et al. (Year: 2021).*

* cited by examiner

*Primary Examiner* — Laura C Guidotti
(74) *Attorney, Agent, or Firm* — Volpe Koenig

(57) ABSTRACT

An apparatus (1) for producing brushware (2), in particular brushes, brooms and/or paintbrushes, including at least two tufting stations (3, 4) for tufting tufts of bristles (5) in brushware bodies (6). The tufting stations (3, 4) are arranged in a shared working space (7) of the apparatus (1), and the apparatus (1), for at least one of the tufting stations (3, 4), includes an individual protection device (8, 9) designed to separate an access region (10, 11) that has the tufting stations (3, 4) and is accessible to an operator (12) from the working space (7) of the apparatus (1).

17 Claims, 9 Drawing Sheets

APPARATUS FOR PRODUCING BRUSHWARE AND METHOD FOR OPERATING SUCH AN APPARATUS

CROSS-REFERENCE TO RELATED APPLICATIONS

This application claims priority to German Patent Application No. 10 2022 126 277.4, which is incorporated herein by reference as if fully set forth.

TECHNICAL FIELD

The invention relates to an apparatus for producing brushware, in particular brushes, brooms and/or paintbrushes, and to a method for operating such an apparatus.

The apparatus comprises at least two tufting stations, which are designed for tufting tufts of bristles in brushware bodies. The two tufting stations are arranged in a shared working space of the apparatus.

BACKGROUND

Changeover operations during a change in pattern, maintenance work or repairs require the deactivation of apparatuses of the type mentioned in the introduction. This leads to stoppage times, during which no brushware can be produced. The overall equipment effectiveness of the apparatus is reduced.

SUMMARY

It is therefore an object of the invention to provide an apparatus and a method of the type mentioned in the introduction which are conducive to higher overall equipment effectiveness, help to avoid or reduce stoppage times, and thus are conducive to the economic production of brushware.

To achieve this object, what is proposed first of all is an apparatus for producing brushware having one or more of the features disclosed herein directed to such an apparatus.

To achieve the object, what is therefore provided in particular is an apparatus for producing brushware, in particular brushes, brooms and/or paintbrushes, which comprises at least two tufting stations for tufting tufts of bristles in brushware bodies. The tufting stations are arranged in a working space of the apparatus. The working space may be a shared working space of the apparatus. According to the invention, the apparatus, for at least one of the tufting stations, comprises an individual protection device designed to separate an access region that comprises the tufting station to which the protection device is assigned from the working space of the apparatus. This access region can then be safely accessible for an operator even during operation of the other tufting station, which is inside the working space of the apparatus but outside the separated-off access region. When an individual protection device is active, access to the rest of the working space of the apparatus can be prevented.

The rest of the working space of the apparatus, from which the access region is then separated by the at least one individual protection device, and the at least one further tufting station arranged therein can thus continue to be used to produce brushware while work can be carried out on the tufting station located in the access region.

In this way, a stoppage time of the apparatus caused by work on the tufting station located in the access region can be effectively avoided. While it is possible to perform maintenance, repair and/or setup measures on the tufting station arranged in the access region separated off by the at least one individual protection device, the rest of the functional units, such as the at least one other tufting station of the apparatus, can continue to be used for processing and producing brushware, without an operator in the access region separated from the working space of the apparatus being endangered in the process.

Preferably, the apparatus comprises a respective individual protection device for each tufting station. In this way, it is possible to separate each tufting station separately and selectively from the working space of the apparatus by means of its respective individual protection device for maintenance, repairs and/or setup purposes. To this end, the corresponding individual protection device can be activated and an access region that then comprises a respective one of the tufting stations can be separated from the working space of the apparatus.

The at least one individual protection device may at least temporarily comprise a protective partition and/or be designed to form a protective partition. The protective partition makes it possible to separate the access region, with a tufting station therein, from the rest of the working space of the apparatus when the protection device is activated.

The at least one individual protection device may be designed, for example, to form an optical protective partition. In particular, at least one light barrier and/or at least one light curtain and/or at least one light grid may be provided as optical protective partition. Multiple light barriers together may form a light curtain and/or a light grid. A light curtain and/or a light grid makes it possible to form a protective partition over a large area in straightforward fashion.

In this context, it may be advantageous if the at least one individual protection device comprises at least one light source and/or at least one light sink. The at least one light source and/or the at least one light sink, in particular together, may form an optical protective partition, in particular at least one light barrier. The light sink may comprise a corresponding sensor system, which makes it possible to detect an interruption of the light barrier.

The at least one individual protection device may comprise at least one deflection mirror. A deflection mirror makes it possible to create a protective partition comprising at least two or three or more partial areas by means of at least one light barrier. The at least one deflection mirror may be arranged between the at least one light source and the at least one light sink for this.

By activating the individual protection device, an optical protective partition can be formed in the working space and, as a result, the access region can be separated from the rest of the working space. Particularly preferably, the individual protection device is designed to form at least one light barrier, light grid and/or light curtain. In particular, the use of a light grid or a light curtain is preferred, since in this way a protective partition can be extended over a comparatively large area inside the working space in particularly straightforward fashion, in order to separate the access region from the rest of the working space. Handling of mechanical protective partitions, such as walls and/or fences and/or meshes, can be avoided by the use of an optical protective partition.

The at least one individual protection device may be provided with and/or connected to a switching-off apparatus. If the protective partition is breached, or the access region is exited toward the rest of the working space of the apparatus, the switching-off apparatus can switch off the functional units of the apparatus, in particular the at least one other tufting station, which are arranged in the working space on the far side of the separated-off access region, in order to avoid endangering the operator. The switching-off apparatus may also be realized by a controller of the apparatus.

A breach of the protective partition or an exit from the access region can be detected, for example, on the basis of an interruption of the aforementioned light barrier and/or of the light grid and/or of the light curtain.

The apparatus may comprise a protective enclosure, for example a protective fence and/or a protective mesh and/or a protective wall, which surrounds the working space of the apparatus and also surrounds the at least one access region that can be separated at least temporarily from the working space of the apparatus using the at least one individual protection device. The protective enclosure then separates the working space of the apparatus from the surroundings of the apparatus. The protective enclosure makes it possible to prevent unintentional and/or unauthorized intrusion in or access to the working space and an associated danger.

The protective enclosure may be openable in the access region. In this way, the at least one access region that can be separated temporarily from the working space using the at least one individual protection device can also be accessed when the protective enclosure is present.

The at least one individual protection device may be activatable by opening the protective enclosure in the access region. If the individual protection device is activated by opening the protective enclosure of the apparatus, a protective partition may for example be automatically brought into position or formed and thus the access region comprising the at least one tufting station can be separated from the working space. It is also possible to deactivate the tufting station arranged in the access region defined by the individual protection device by opening the protective enclosure in the access region and/or by activating the individual protection device.

This can be done automatically by means of a controller of the apparatus.

The at least two tufting stations of the apparatus may be functionally redundant to one another. This embodiment of the apparatus is particularly expedient if a brushware pattern is to be produced on the apparatus and the production is not to be interrupted by maintenance, setup and/or repairs on one of the two tufting stations. A temporary shift of production to only one of two tufting stations is therefore possible if the at least one other tufting station needs to be deactivated.

The two redundant tufting stations make it possible to continue to operate the apparatus without interruption, at least with reduced power and output.

The apparatus may comprise, preferably inside the working space, at least one station for processing and/or handling brushware and/or brushware bodies. This at least one station may be arranged in the working space in addition to the two tufting stations.

At least one further station that can be used is for example a post-processing station, in particular a milling station, and/or a drilling station and/or a handling station. It is possible to post-process brushware bodies and/or a set of bristles on a brushware body at a post-processing station, for example a milling station. At a drilling station, tuft receiving holes can be created in a brushware body that is held ready.

At a handling station, it is possible to charge the apparatus with brushware bodies and/or remove fully produced brushware.

The apparatus may comprise a transport apparatus. The transport apparatus may comprise at least one transport holder, which makes it possible to move brushware and/or brushware bodies between stations of the apparatus inside the working space. Using the transport apparatus and its at least one transport holder, it is therefore possible to feed the brushware bodies and/or brushware for the individual processing and/or handling steps to be carried out at the different stations of the apparatus.

In one embodiment of the apparatus, the transport apparatus is in the form of a transport carousel. A transport apparatus in the form of a transport carousel can be distinguished by at least one closed transport path, along which the at least one transport holder of the transport apparatus can be moved, with a brushware body mounted thereon and/or brushware mounted thereon, between the stations of the apparatus.

In one embodiment of the transport apparatus, it is provided that it has at least two transport planes. The transport planes may be arranged vertically one above another in this case. This promotes the provision of an apparatus with a low space requirement. In each of the transport planes, at least one respective transport holder can be movable between the stations of the apparatus along a, for example closed, transport path.

In this connection, it may be advantageous if at least one tufting station of the apparatus comprises a tufting tool which can be moved to working positions in each of the at least two transport planes of the transport apparatus. It is thus possible to use a tufting tool of a tufting station to tuft tufts of bristles in brushware bodies held ready in each of the at least two transport planes.

In this case, the at least one tufting station may have a guide, along which its tufting tool can be moved to the working positions in the at least two transport planes of the transport apparatus.

In one embodiment of the apparatus, it is provided that at least one tufting station has at least one respective tufting tool for each of the at least two transport planes. In this way, it is possible to tuft tufts of bristles in each of the two transport planes in brushware bodies that are held ready there.

In the process, in the different transport planes, either the same brushware pattern or else different brushware patterns can be produced and tufted.

The apparatus may comprise a number of tufting stations which corresponds to the number of transport planes of the transport apparatus. In this case, each tufting station may comprise a respective tufting tool and each transport plane may be assigned a respective tufting tool. In this embodiment, the apparatus therefore comprises a number of tufting tools distributed among its tufting stations that corresponds to the number of transport planes. In this embodiment of the apparatus, the different tufting stations are therefore assigned to respective different transport planes of the transport apparatus of the apparatus. It is also possible here to produce either the same brushware pattern or else different brushware patterns in the different transport planes. The tufting tools of the tufting stations are then also designed and equipped in accordance with the brushware pattern.

In one embodiment of the apparatus, each tufting station comprises a number of tufting tools which corresponds to the number of transport planes of the transport apparatus. This makes it possible to tuft brushware bodies in all the transport planes even if one of the at least two tufting stations is deactivated.

The apparatus may comprise a controller. The controller may be designed to activate at least one individual protection device, in particular when the protective enclosure of the apparatus is opened or is open in the access region. It is also possible to use the controller to deactivate the tufting station to which the at least one individual protection device is assigned, in particular if the individual protection device is activated and/or the protective enclosure of the apparatus is opened in the access region in which the tufting station is arranged. Therefore, the controller can act as a switching-off apparatus for the at least one individual protection device.

The controller may also be designed to actuate functional units of the apparatus. In particular, the controller may be designed to actuate the tufting stations, the aforementioned at least one individual protection device, and the at least one further station and/or the transport apparatus.

To achieve the object, a method for operating an apparatus is also provided. In this respect, at least one of the at least two tufting stations continues to be operated in the working space of the apparatus for tufting tufts of bristles in brushware bodies, when the individual protection device assigned to another one of the at least two tufting stations is activated and an access region containing the other tufting station is separated from the working space of the apparatus.

BRIEF DESCRIPTION OF THE DRAWINGS

The invention will now be described in more detail on the basis of exemplary embodiments, but it not restricted to these exemplary embodiments. Further exemplary embodiments will emerge by combining the features of individual or multiple patent claims with one another and/or by combining individual or multiple features of the exemplary embodiments. In the figures:

DETAILED DESCRIPTION

Figure 1:
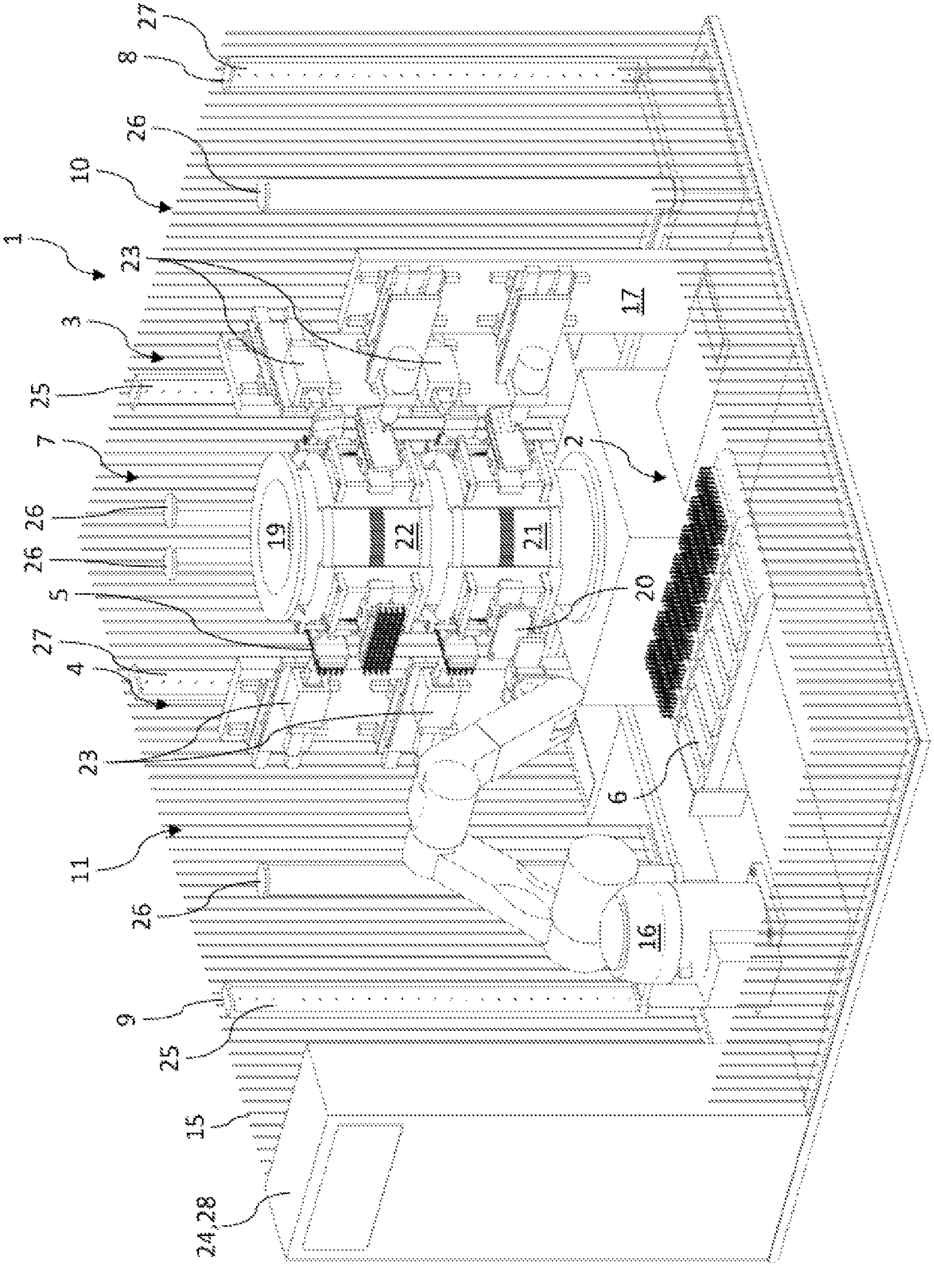
FIG. 1 shows an isometric illustration of a first embodiment of an apparatus for producing brushware, wherein the apparatus, in its working space, comprises two tufting stations each with two tufting tools, a transport apparatus with transport holders, a drilling station and a handling station, and wherein each of the tufting stations is assigned an individual protection device for separating a respective access region from the working space of the apparatus.

All of the figures show, in each case as a whole by 1, apparatuses for producing brushware 2. The brushware 2 produced on the apparatuses 1 are brushes.

Each of the apparatuses 1 shown comprises two respective tufting stations 3 and 4, which are designed for tufting tufts of bristles 5 in brushware bodies 6. The two tufting stations 3 and 4 are arranged in a shared working space 7 of the apparatus 1. Each apparatus 1 comprises a respective individual protection device 8 and 9 for each of the two tufting stations 3 and 4. Each of the individual protection devices 8 and 9 are designed to separate a respective access region 10 and 11 that contains the respective tufting station 3, 4 to which the individual protection devices 8, 9 are respectively assigned from the working space 7 of the apparatus 1. The access regions 10, 11 are then accessible for an operator 12, even if brushware 2 continues to be produced in the working space 7 outside the access region 10, 11.

FIGS. 2 and 3, 5 and 6 and also 8 and 9 show the formation of the different access regions 10 and 11 by the individual protection devices 8 and 9. Here, it can be seen that the tufting stations 3 and 4 respectively arranged in the access regions 10 and 11 are accessible for an operator 12 when the respective individual protection devices 8 and 9 are activated, without it being necessary to deactivate the rest of the functional units of the apparatus 1, in particular the respective other tufting station 4 or 3, in the working space 7 of the apparatus 1 for this.

Each of the tufting stations 3 and 4 is therefore assigned a respective dedicated, individual protection device 8, 9 for temporarily separating an access region 10, 11 from the working space 7 of the apparatus 1.

The protection devices 8 and 9 are each designed to at least temporarily form a protective partition 13. The protective partitions 13 that can be formed using the individual protection devices 8 and 9 serve to separate the access regions 10, 11 from the working space 7 of the apparatus 1.

In the exemplary embodiments of the apparatus 1 that are shown in the figures, the individual protection devices 8 and 9 are each designed to form an optical protective partition 13. Specifically, the protection devices 8 and 9 are designed to form an optical protective partition 13 in the form of multiple light barriers 14, which together form a light grid or a light curtain. Each individual protection device 8 and 9 comprises a respective light source 25 and light sink 27 for this purpose. The light barriers 14 are then formed between the light sources 25 and the light sinks 27 of the individual protection devices 8, 9. In the case of each individual protection device 8, 9, two respective deflection mirrors 26 are arranged between the light sources 25 and light sinks 27.

The deflection mirrors 26 serve to deflect the light beams emitted by the respective light source 25 and guide them to the respective light sink 27. In this way, it is possible to extend an optical protective partition 13, comprising multiple partial areas, of light barriers 14 in the working space 7 of the apparatus 1 and thus separate the respective access region 10, 11 from the working space 7.

Each light sink 27 is equipped with a corresponding sensor system which allows an interruption of the light barrier 14 formed between the light source 25 and the light sink 27 to be detected.

The apparatus 1 comprises a switching-off apparatus 28, which is designed to deactivate the apparatus 1, in particular to deactivate the individual tufting stations 3, 4, when the protective partition 13, in particular the light barriers 14 forming the light curtain or the light grid, of the respective individual protection device 8 or 9 is/are breached. Specifically, a controller 24, explained in more detail below, of the apparatus 1 acts as a switching-off apparatus 28.

All of the apparatuses 1 shown also comprise a protective enclosure 15. The protective enclosure 15 consists of a protective fence, a protective mesh and/or a protective wall, which surrounds the working space 7 and all the access regions 10 and 11 inside the working space 7. For reasons of clarity, the protective enclosure 15 is illustrated in cut-away fashion in the regions of the individual figures that face toward a viewer.

The protective enclosure 15 can be opened in the access regions 10 and 11. The individual protection devices 8 and 9 can be activated by opening the protective enclosure 15 in the respective access region 10 and 11. The opening of the protective enclosure 15 and/or the activation of the individual protection device 8, 9 can lead to the deactivation of the tufting station 3 or 4 arranged in the respective access region 10 or 11. In the event of a breach of the protective partition 13 which is respectively provided by the respective individual protection device 8 or 9 and is in the form of the light barriers 14 forming the light curtain or the light grid, this also leads to deactivation of the tufting station 3 or 4 operating outside the access region 10 or 11 and also to deactivation of the rest of the functional units that are operated outside the access region 10 or 11 in the working space 7 of the apparatus 1.

The tufting stations 3 and 4 of the apparatuses 1 shown in FIGS. 1-3, 4-6 and 7-9 are functionally redundant.

Inside its working space 7, each apparatus 1 also comprises further stations in addition to the two tufting stations 3 and 4. One of the further stations is a handling station 16. The handling station 16 serves to insert brushware bodies 6 and to remove finished brushware 2.

Each of the apparatuses 1 shown in the figures also comprises a further working station 17 or 18 inside its respective working space 7.

In the case of the apparatus 1 shown in FIGS. 1-3 and 4-6, the processing station is a drilling station 17. Using the drilling station 17, tuft receiving holes can be made in the brushware bodies 6 held ready at the drilling station 17.

Figure 7:
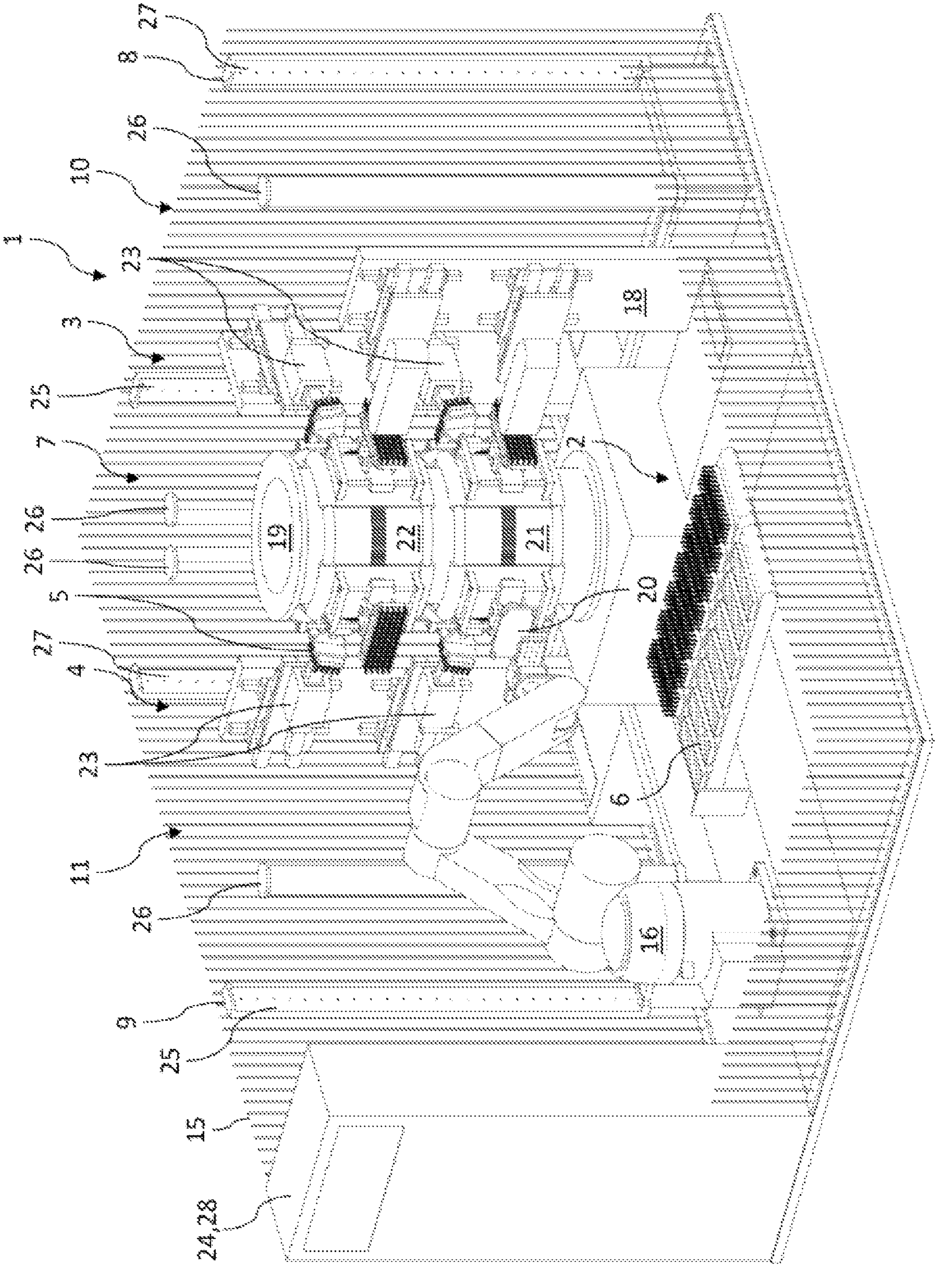
FIGS. 7-9: show isometric illustrations of a further apparatus for producing brushware, wherein the apparatus shown in these figures differs from the apparatus shown in FIGS. 1-3 in that, instead of a drilling station, in which receiving holes for tufts of bristles can be introduced into brushware bodies that are held ready, it comprises a post-processing station, specifically a milling station.
Figure 8:
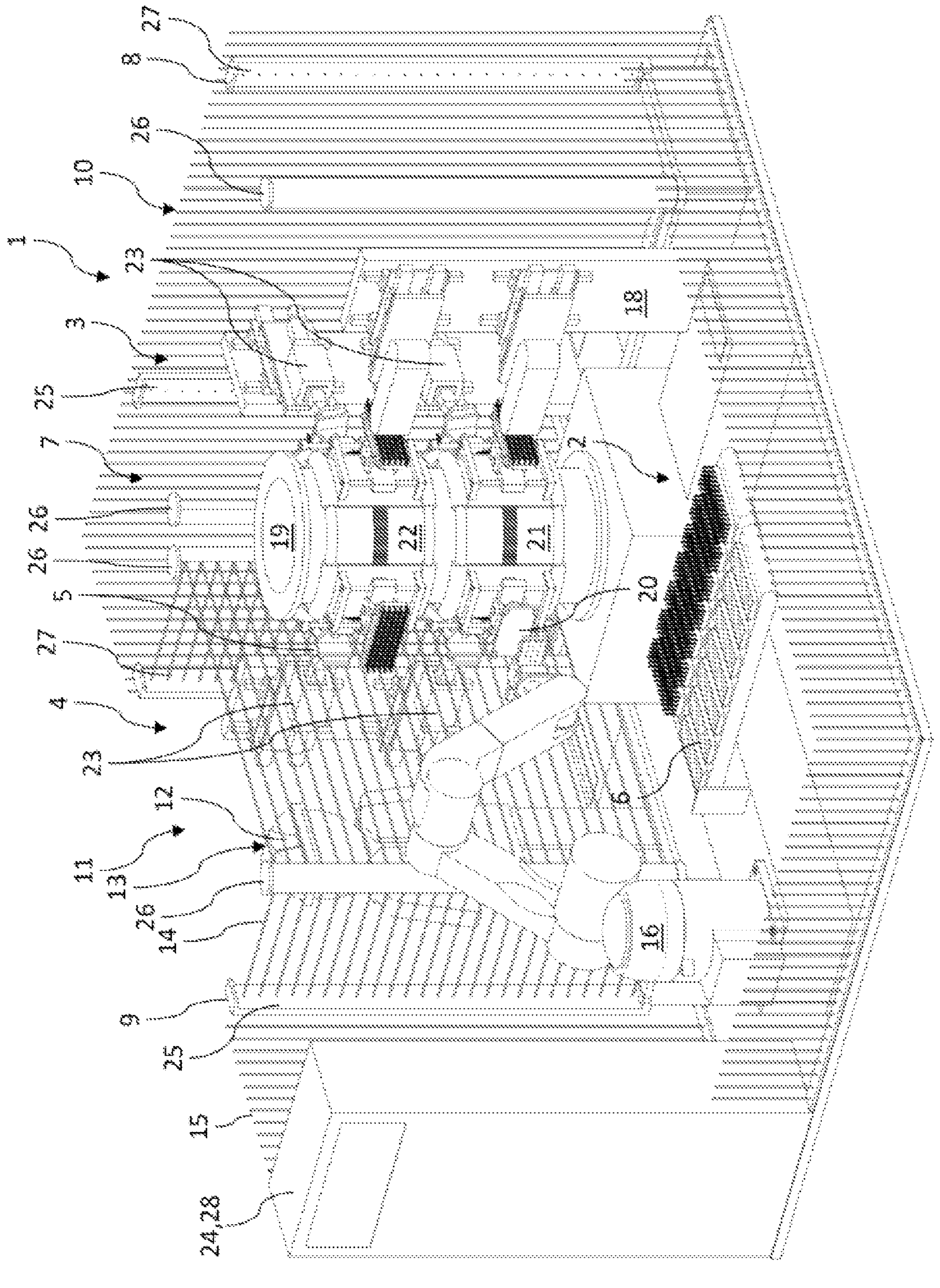
Figure 9:
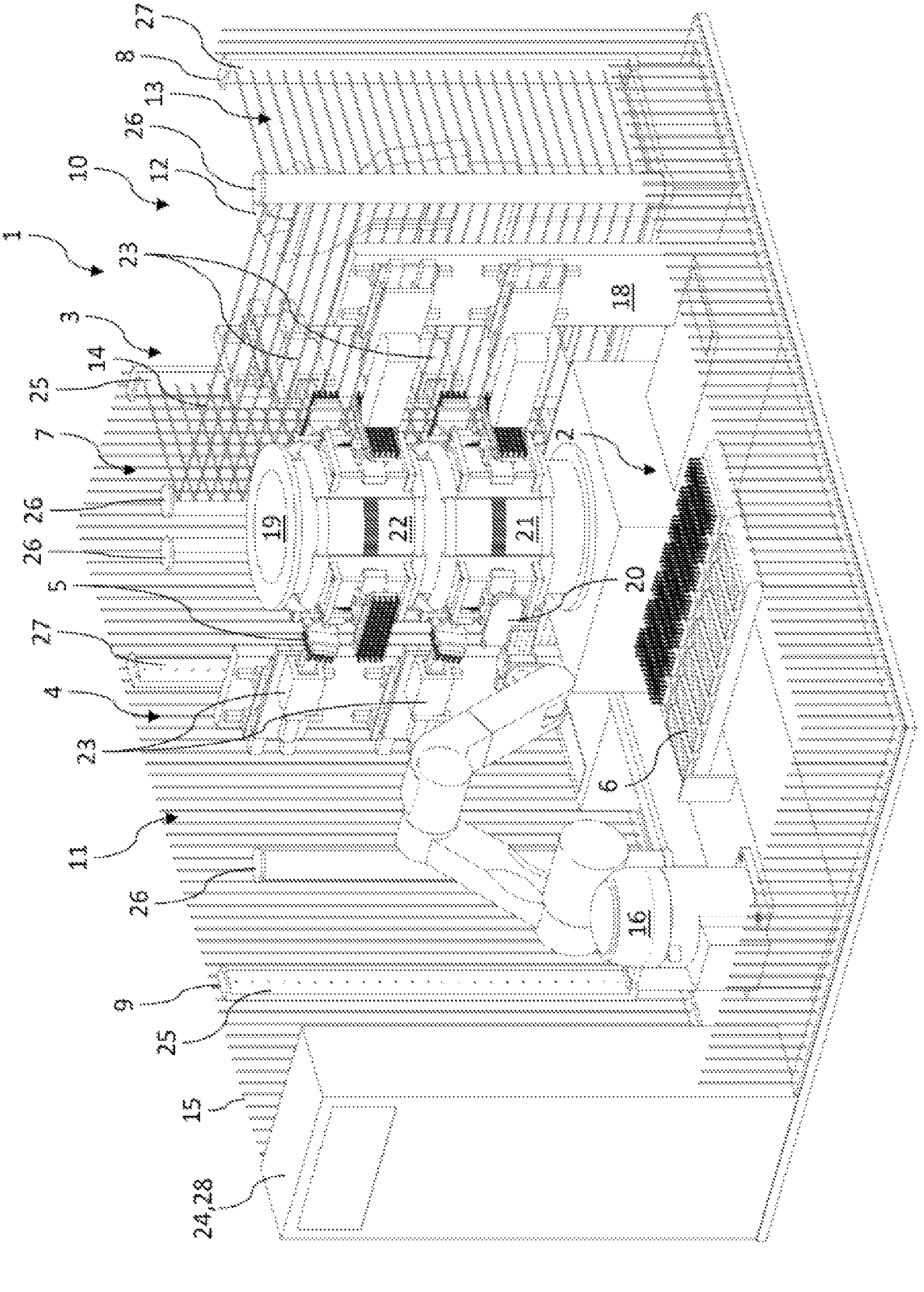

By contrast to this, the apparatus 1 shown in FIGS. 7-9 comprises as processing station, instead of a drilling station 17, a post-processing station in the form of a milling station 18. Using the milling station 18, tufts of bristles 5 tufted in brushware bodies 6 can be shortened and/or sanded and/or rounded.

Each of the apparatuses 1 shown comprises a respective transport apparatus 19. The transport apparatuses 19 are each in the form of a transport carousel and comprise closed transport paths. The transport apparatuses 19 each comprise multiple transport holders 20, by means of which brushware 2 and/or brushware bodies 6 can be moved along the closed transport paths between the stations 3, 4, 16, 17 and/or 18 inside the working space 7.

The transport apparatuses 19 each have two transport planes 21 and 22, which are arranged one above the other and in which four respective transport holders 20 can be moved between the stations 3, 4, 16, 17 and 18 of the apparatus 1. Depending on the embodiment of the apparatus 1, the tufting stations 3 and 4 each comprise one or two tufting tools 23.

Figure 2:
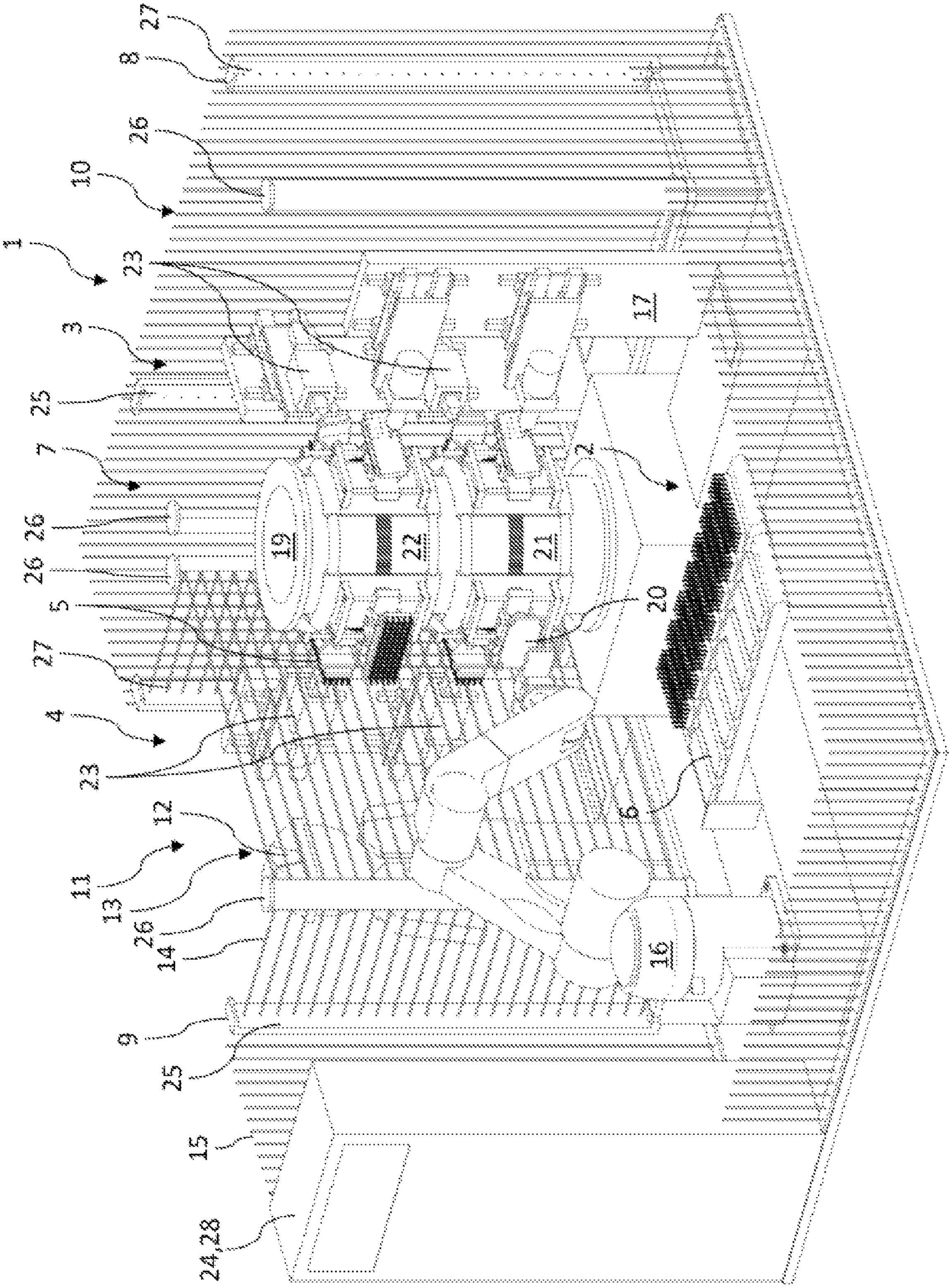
FIG. 2 shows the apparatus shown in FIG. 1, wherein a first one of two access regions is separated from the working space of the apparatus using an individual protection device.
Figure 3:
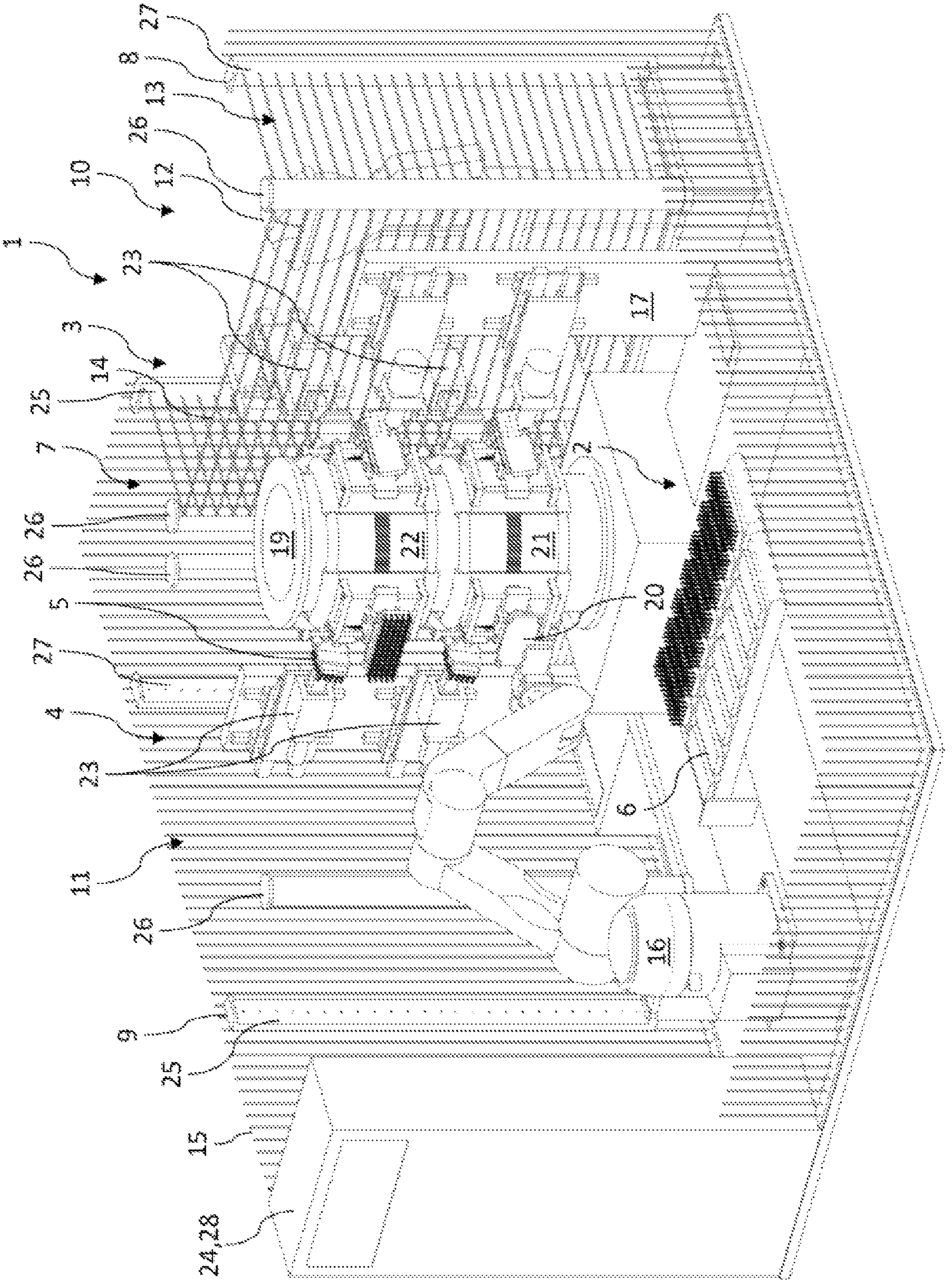
FIG. 3 shows the apparatus shown in FIGS. 1 and 2 with a second access region that is separated from the working space by the second individual protection device and contains the second one of the two tufting stations.

In the case of the apparatus 1 shown in FIGS. 1-3, each tufting station 3 and 4 comprises two respective tufting tools 23. In this respect, each of the two transport planes 21 and 22 is assigned a respective tufting tool 23 of the two tufting stations 3 and 4.

Figure 4:
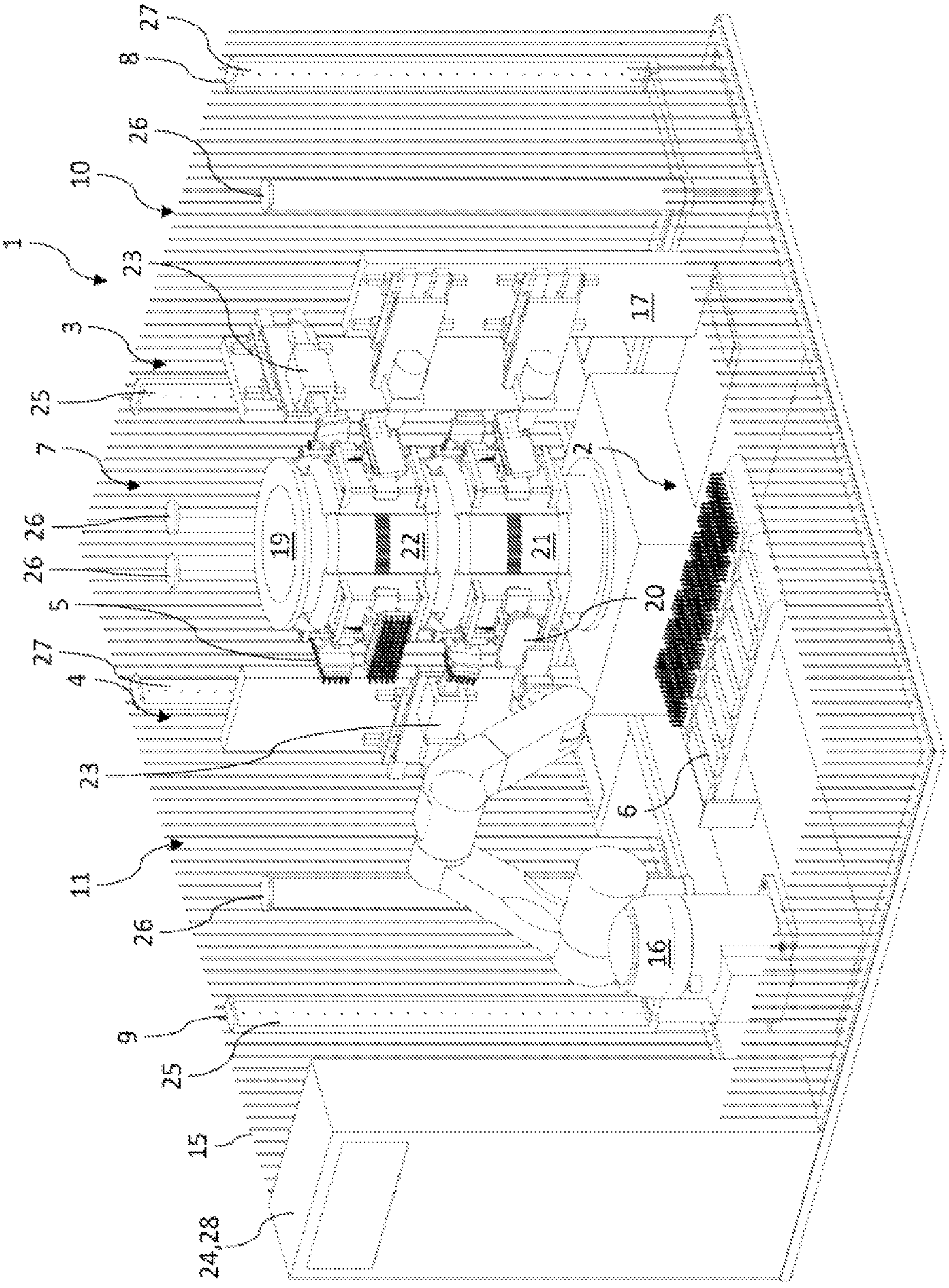
FIGS. 4-6: show isometric illustrations of a further embodiment of an apparatus which differs from the apparatus shown in FIGS. 1-3 in terms of the structure of its two tufting stations, each of which has only one tufting tool, wherein each one of the two tufting tools is assigned to one of two transport planes of the transport apparatus.
Figure 5:
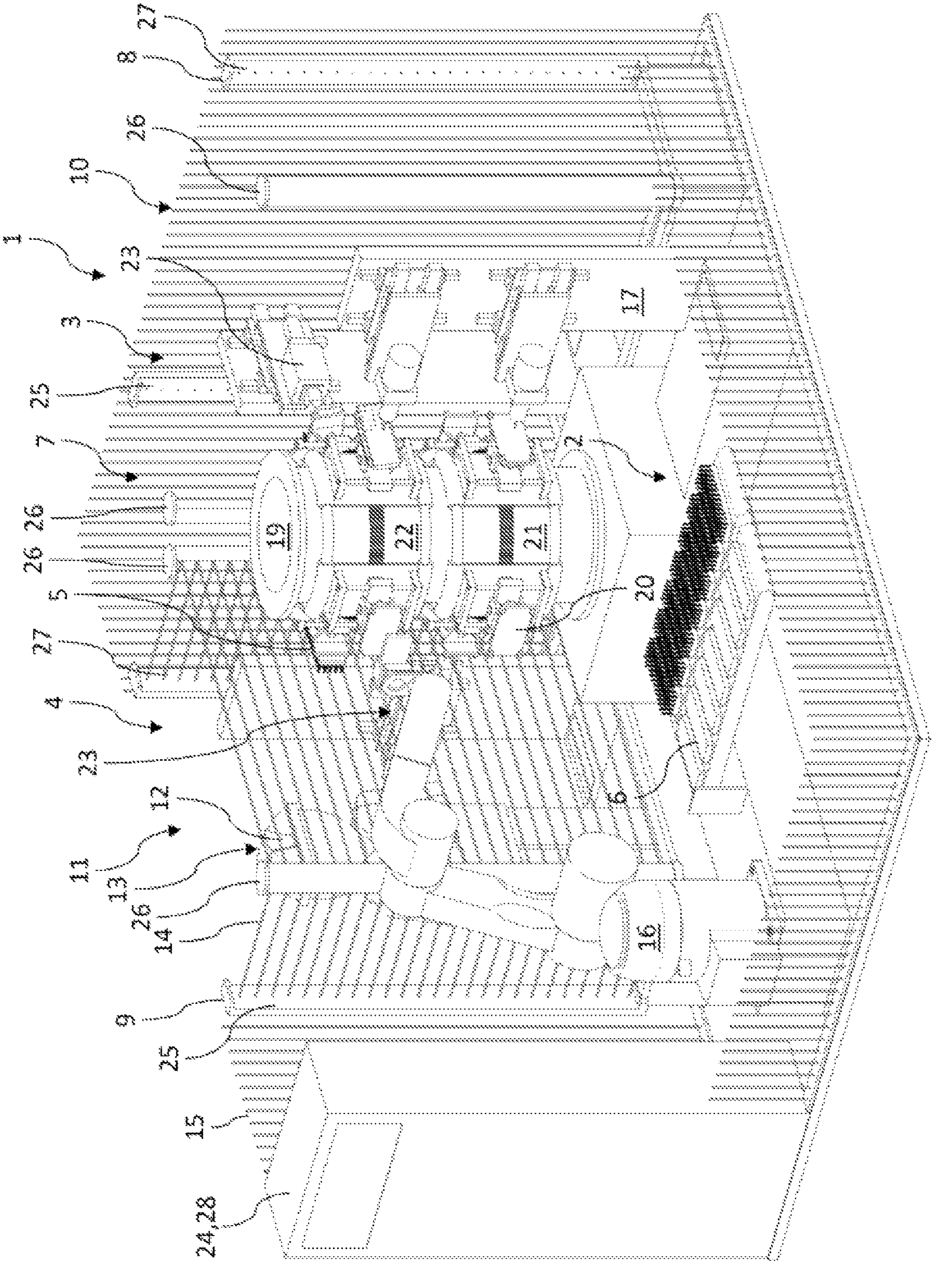
Figure 6:
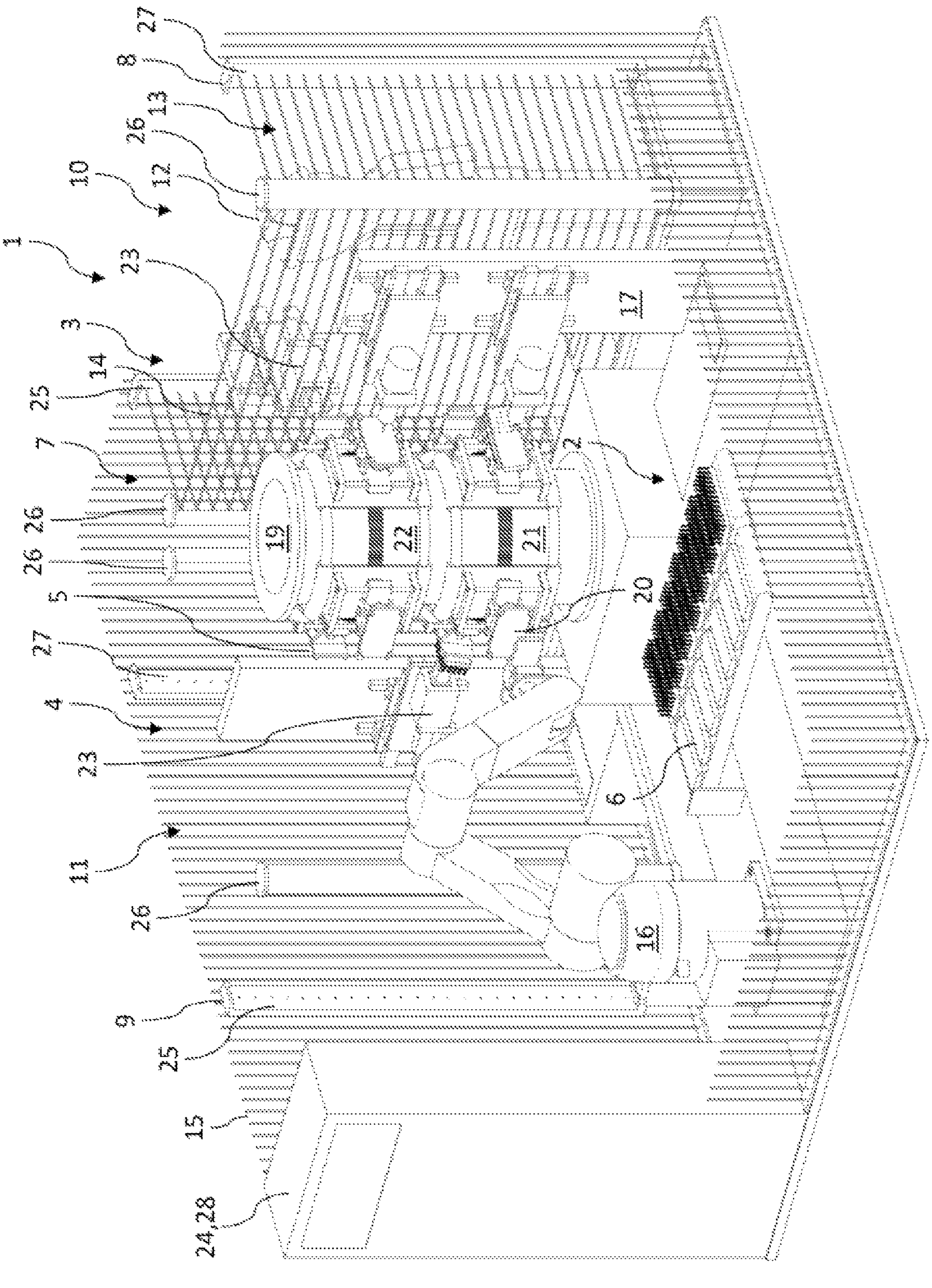

In the case of the apparatus 1 shown in FIGS. 4-6, a respective one of the two tufting stations 3 and 4 is assigned to one of the two transport planes 21 and 22 of the transport apparatus 19. In the case of this apparatus 1, each of the tufting stations 3 and 4 has exactly one respective tufting tool 23, wherein each of the transport planes 21 and 22 is assigned a respective tufting tool 23 of one of the two tufting stations 3 or 4 in that case.

With regard to the structure of the tufting stations 3 and 4, the apparatus 1 shown in FIGS. 7-9 corresponds to the apparatus 1 shown in FIGS. 1-3.

All of the apparatuses 1 therefore comprise a respective number of tufting stations 3 and 4 which corresponds to the number of transport planes 21 and 22 of the respective transport apparatus 19.

Each apparatus 1 comprises a controller 24. The controller 24 is designed to activate the individual protection devices 8 and 9, in particular if the protective enclosure 15 of the apparatus 1 is opened or is open in the access regions 10 or 11. The controllers 24 are also designed to deactivate the tufting stations 3, 4 when the individual protection device 8, 9 assigned to the respective tufting station 3, 4 is activated.

The controllers 24 are also designed to deactivate all the functional units of the respective apparatus 1 if the respective protective partition 13 of the individual protection devices 8 or 9 is breached. This serves to protect an operator 12 who moves from the access region 10 or 11 to the rest of the working space 7 and in the process breaches the protective partition 13. The controller 24 can therefore also perform the function of a switching-off apparatus 28.

The controllers 24 are furthermore also designed to control the individual stations 3, 4, 16, 17 and 18 of the respective apparatus 1 and also its transport apparatuses 19 and the transport holder 20.

Each of the apparatuses 1 shown in the figures enables the following method for operating the apparatus 1.

In this case, the intention is to continue to operate at least one of the at least two tufting stations 3, 4 of the respective apparatus 1 for tufting tufts of bristles 5 in brushware bodies 6 if an individual protection device 8, 9 assigned to another one of the two tufting stations 3, 4 is activated and the respective access region 10, 11 is separated from the working space 7 of the apparatus 1.

The method for operating the apparatuses 1 is explained in more detail on the basis of the following embodiments:

According to FIG. 1, brushware bodies 6 in the two transport planes 21, 22 are processed in the drilling station 17 of the apparatus 12 shown in that figure, wherein tuft receiving holes for tufts of bristles 5 are created in the brushware bodies 6. The tufting station 3 is inactive according to FIG. 1, while, at the tufting station 4, tufts of bristles 5 are introduced into the brushware bodies 6 held ready at the tufting station 4 using the two tufting tools 23.

FIG. 2 shows a situation in which a fault has occurred at the tufting station 4. The tufting station 3 immediately takes on the work of the tufting station 4. By activating the individual protection device 9 assigned to the tufting station 4, a light grid of light barriers 14 in the form of a protective partition 13 is created and the access region 11 in which the tufting station 4 is arranged is separated from the working space 7 of the apparatus 1. An operator 12 can now correct the fault at the tufting station 4, while production can be continued outside the access region 11 using the tufting station 3.

FIG. 3 shows the reverse situation. Here, a fault has now occurred at the tufting station 3. However, the apparatus 1 can continue to work, since the tufting station 4 takes on the work of the tufting station 3 while the latter is repaired by an operator 12. To that end, the access region 10 is then separated from the working space 7 by means of the individual protection device 8. It is also possible to use the principle depicted by means of FIGS. 1-3 in the event of a change in pattern.

It is thus conceivable that, according to FIG. 2, new brushware patterns are set or set up on the tufting station 3, while the previous brushware pattern is still being tufted in the other tufting station 4. When all the brushware has been duly produced with the previous brushware pattern, it is possible, as can be seen in FIG. 3, to seamlessly switch over to tufting the new brushware pattern on the tufting station 3, which is retrofitted in the interim, and the tufting station 4 can be correspondingly refitted.

If the number of brushware in a series or of a brushware pattern is quite small, it is possible to set up only one of the tufting stations 3 or 4. In the process, the other tufting station 4 or 3 can already be refitted with the next brushware pattern to be produced. As a result, as many as possible different brushware patterns can be produced in a short time.

The apparatus 1 shown in FIGS. 4-6 allows a comparable procedure. FIG. 5 shows that a fault has occurred at the tufting station 4. By activating the individual protection device 9, the access region 11 in which the tufting station 4 is arranged can be separated from the working space 7. An operator 12 can perform the required work on the tufting station 4 without it being necessary to completely interrupt the operation of the apparatus 1. While the tufting station 4 assigned to the lower transport plane 21 of the two transport planes 21 and 22 is being repaired, brushware bodies 6 are tufted with tufts of bristles 5 only in the upper transport plane 22. The apparatus 1 is thus operated at half output. FIG. 6 shows the reverse situation, in which a fault has occurred at the tufting station 3.

It is also possible here in the event of a change in pattern to refit a tufting station 3 or 4, while work can continue on the other tufting station 4 or 3.

In the case of the apparatus 1 shown in FIGS. 7-9, brushware bodies 6 already provided with tuft receiving holes are supplied. The tuft receiving holes may for example be pre-injected or pre-drilled. In the case of the apparatus 1 shown in FIGS. 7-9, the brushware bodies 6 are switched between the individual stations of the apparatus 1 clockwise, by contrast to the case of the apparatuses 1 shown in the rest of the figures. Instead of a drilling station 17, this apparatus 1 comprises a milling station 18. The milling station 18 is downstream of the two tufting stations 3 and 4 in the transport direction of the brushware bodies 6 through the apparatus 1.

According to FIG. 7, in a first working step, first of all the one half of a bristle area of the brushware 2 to be produced is tufted at the two tufting stations 3 and 4 of the apparatus 1. Then, the partially tufted brushware bodies 6 are transferred to the other tufting station 4 or 3, respectively. The rest of the tufts of bristles 5 are then tufted there.

In the milling station 18, the brushware bodies 6 are then post-processed. According to FIG. 7, a fault has occurred in the tufting station 4. The production of brushware 2 can be continued on the tufting station 3 while the fault on the tufting station 4 is corrected by an operator 12.

For this, the individual protection device 9 assigned to the tufting station 4 is activated, in order to form the protective partition 13 in the form of light barriers 14 and to separate the access region 11 in which the tufting station 4 is arranged from the rest of the working space 7 of the apparatus 1.

It is also possible in the case of the embodiment of the apparatus 1 shown in FIGS. 7-9 to activate the individual protection devices 8 and 9 to change from one brushware pattern to another brushware pattern, in order to continue to use the apparatus 1 at reduced output to complete an order at least during the transition.

LIST OF REFERENCE SIGNS

1 Machine tool, specifically apparatus for producing brushware
2 Brushware
3 Tufting station
4 Tufting station
5 Tuft of bristles
6 Brushware body
7 Working space
8 Individual protection device for 3
9 Individual protection device for 4
10 Access region, provided by 8 with 3
11 Access region, provided by 9 with 4
12 Operator
13 Protective partition
14 Light barrier
15 Protective enclosure
16 Handling station
17 Drilling station
18 Milling station
19 Transport apparatus
20 Transport holder
21 Transport plane
22 Transport plane
23 Tufting tool
24 Controller
25 Light source
26 Deflection mirror
27 Light sink
28 Switching-off apparatus

The invention claimed is:

1. An apparatus (1) for producing brushware (2), the apparatus comprising:

at least two tufting stations (3, 4) for tufting tufts of bristles (5) in brushware bodies (6);

a shared working space (7) in which the tufting stations (3, 4) are arranged;

at least one individual protection device (8, 9) for at least one of the tufting stations (3, 4), the at least one individual protection device (8, 9) is configured to separate an access region (10, 11) that comprises the tufting stations (3, 4) from the working space (7); and a protective enclosure (15) which surrounds the working space (7), wherein the protective enclosure (15) is openable in the access region (10, 11), and the at least one individual protection device (8, 9) is configured to be activated by opening the protective enclosure (15) in the access region (10, 11).

2. The apparatus (1) according to claim 1, wherein a respective one of the individual protection devices (8, 9) is provided for each of the tufting stations (3, 4).

3. The apparatus (1) according to claim 1, wherein the at least one individual protection device (8, 9) at least temporarily comprises a protective partition (13) and/or forms a protective partition (13) which separates the access region (10, 11) from a remainder of the working space (7).

4. The apparatus (1) according to claim 1, wherein the at least one individual protection device (8, 9) comprises an optical protective partition (13) comprising at least one of a light barrier (14), a light curtain, or a light grid.

5. The apparatus (1) according to claim 1, wherein the at least one individual protection device (8, 9) comprises at least one of a light source (25), a light sink (27), or a deflection mirror (26) for forming an optical protective partition (13).

6. The apparatus (1) according to claim 1, further comprising a switching-off apparatus (28), which is configured to at least deactivate the other of at least two tufting stations (3, 4), when a protective partition (13) of the individual protection device (8, 9) is breached.

7. The apparatus (1) according to claim 1, wherein the protective enclosure (15) surrounds the working space and the access region (10, 11) that is separable from the working space (7) by the at least one individual protection device (8, 9).

8. The apparatus (1) according to claim 1, wherein the at least one of the at least two tufting stations (3, 4) is deactivatable by at least one of activating the individual protection device (8, 9) assigned thereto or by opening the protective enclosure (15).

9. The apparatus (1) according to claim 1, wherein the at least two tufting stations (3, 4) are functionally redundant to one another.

10. The apparatus (1) according to claim 1, further comprising at least one station for processing and/or handling at least one of brushware (2) or brushware bodies (6).

11. The apparatus (1) according to claim 1, further comprising a transport apparatus (19) having at least one transport holder (20), which is configured to move at least one of brushware (2) or brushware bodies (6) between stations (3, 4, 16, 17, 18) inside the working space (7).

12. The apparatus (1) according to claim 11, wherein the transport apparatus (19) comprises at least two transport planes (21, 22), in each of which at least one transport holder (20) is moveable between the stations (3, 4, 16, 17, 18).

13. The apparatus (1) according to claim 12, wherein at least one of the tufting stations (3, 4) comprises a tufting tool (23), which is moveable to working positions in each of the at least two transport planes (21, 22) of the transport apparatus (19), and at least one of the tufting stations (3, 4) comprises a guide, along which the tufting tool (23) is moveable to the working positions in the at least two transport planes (21, 22) of the transport apparatus (19), or at least one of the tufting stations (3, 4) comprises at least one respective tufting tool (23) for each of the at least two transport planes (21, 22).

14. The apparatus (1) according to claim 12, wherein the at least two tufting stations includes a number of tufting stations (3, 4) which corresponds to a number of the transport planes (21, 22) of the transport apparatus (19), and each of the tufting stations (3, 4) comprises a number of tufting tools (23) which corresponds to the number of the transport planes (21, 22) of the transport apparatus (19), or each of the tufting stations (3, 4) comprise a respective one of the tufting tools (23) and each of the transport planes (21, 22) is assigned a respective one of the tufting tools (23).

15. The apparatus (1) according to claim 1, further comprising a controller (24), which is configured to at least one of activate the at least one individual protection device (8, 9) when the protective enclosure (15) is opened or is open in the access region (10, 11), or to deactivate the at least one of the tufting stations (3, 4) to which the individual protection device (8, 9) is assigned when the individual protection device (8, 9) is or has been activated.

16. The apparatus (1) according to claim 15, wherein the controller (24) is further configured to actuate functional units of the apparatus (1).

17. A method for operating an apparatus (1) according to claim 1, the method comprising continuing to operate at least one of the at least two tufting stations (3, 4) in the working space (7) when the individual protection device (8, 9) assigned to another one of the at least two tufting stations (3, 4) is activated and an access region (10, 11) containing the other tufting station (3, 4) is separated from the working space (7).

* * * * *